(12) United States Patent
Sapper et al.

(10) Patent No.: US 6,296,903 B1
(45) Date of Patent: Oct. 2, 2001

(54) AQUEOUS COATING POWDER DISPERSION, METHOD FOR THE PRODUCTION AND USE OF SAID DISPERSION

(75) Inventors: Ekkehard Sapper, Rimpar; Joachim Woltering, Münster, both of (DE)

(73) Assignee: Basf Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/424,049

(22) PCT Filed: Jul. 1, 1998

(86) PCT No.: PCT/EP98/04056

§ 371 Date: Jan. 13, 2000

§ 102(e) Date: Jan. 13, 2000

(87) PCT Pub. No.: WO99/01499

PCT Pub. Date: Jan. 14, 1999

(30) Foreign Application Priority Data

Jul. 1, 1997 (DE) ............................. 197 27 892

(51) Int. Cl.$^7$ ................. B05D 1/06; B05D 7/16
(52) U.S. Cl. ............... 427/195; 427/202; 427/407.1; 427/409
(58) Field of Search ............... 427/407.1, 180, 427/189, 195, 202, 409

(56) References Cited

U.S. PATENT DOCUMENTS

| 3,290,350 | 12/1966 | Hoover ................. 260/453 |
| 3,341,580 | 9/1967 | Hechenbleikner et al. ......... 260/541 |
| 3,477,990 | 11/1969 | Dante et al. ............ 260/47 |
| 3,781,379 | 12/1973 | Theodore ................. 260/836 |
| 4,091,048 | 5/1978 | Labana et al. ......... 260/836 |
| 4,130,577 | 12/1978 | Nagato et al. ............ 260/453 |
| 4,268,542 | 5/1981 | Sakakibarta et al. ........ 427/195 |
| 4,439,616 | 3/1984 | Singh et al. ............ 560/25 |
| 4,446,257 | * | 5/1984 | Kooijmans et al. ........ 523/403 |

FOREIGN PATENT DOCUMENTS

| 756 693 | 3/1971 | (BE) . |
| 22 14 650 B2 | 3/1972 | (DE) . |
| 27 49 576 B2 | 11/1977 | (DE) . |
| 36 36 183 A1 | 10/1986 | (DE) . |
| 195 26 759 A1 | 7/1995 | (DE) . |
| 196 18 657 A1 | 5/1996 | (DE) . |
| 0 101 832 A1 | 7/1983 | (EP) . |
| 0 226 527 A2 | 11/1986 | (EP) . |
| 0 229 420 A1 | 7/1988 | (EP) . |
| 0 604 922 A1 | 12/1993 | (EP) . |
| WO 94/09913 | 5/1994 | (EP) . |
| WO 97/15616 | 5/1997 | (EP) . |

OTHER PUBLICATIONS

Translation of DE19526759, Jan. 1997.*

* cited by examiner

Primary Examiner—Erma Cameron

(57) ABSTRACT

The present invention relates to an aqueous powder coating dispersion which can be prepared by processing the binder of the powder coating material and/or the crosslinker of the powder coating material or the entire powder coating material to give a powder by spray drying and then preparing an aqueous powder coating dispersion using the spray-dried powder. The present invention additionally relates to a process for preparing the aqueous powder coating dispersion and to the use of the powder coating dispersion, especially for the coating of automobile bodies.

18 Claims, No Drawings ured coat thicknesses are necessary in order to achieve# AQUEOUS COATING POWDER DISPERSION, METHOD FOR THE PRODUCTION AND USE OF SAID DISPERSION The present invention relates to an aqueous powder coating dispersion which is particularly suitable for preparing pigment pastes, solid-color topcoats, and clearcoats.

The present invention additionally relates to a process for preparing the aqueous powder coating dispersion arid to the use of the powder coating dispersion, especially for the coating of automobile bodies.

For the coating of automobile bodies, preference is currently given to the use of liquid coating materials. These cause numerous environmental problems owing to their solvent content. The same applies to cases where water-based coating materials are employed.

For this reason, increased efforts have been made in recent years to use powder coating materials for coating. The results so far, however, are not satisfactory; in particular, increased coat thicknesses are necessary in order to achieve a uniform appearance. On the other hand, the use of pulverulent coating materials entails a different application technology. The plants set up for liquid coating materials cannot, therefore, be used for powder coatings. Therefore, the attempt is being made to develop powder coating materials in the form of aqueous dispersions which can be processed using liquid coating technologies.

U.S. Pat. No. 4,268,542, for example, discloses a process in which a powder coating slurry is used which is suitable for the coating of automobiles. In this case, a conventional powder coat is first applied to the bodywork, and the clearcoat slurry is applied as second coat. In the case of this clearcoat slurry, acrylate resin-based binders and ionic thickeners are used. With these clearcoat slurries it is necessary to operate at high baking temperatures (more than 160° C.).

In the text below, the term transparent powder coating dispersion is used synonymously with powder clearcoat slurry.

DE-A-196 18 657 discloses an aqueous powder coating dispersion which can be prepared by first producing a powder coating material from a binder and crosslinker and, if desired, further auxiliaries and additives by means of extrusion and milling of the extrudate, dispersing this powder coating material in water, and then subjecting the aqueous powder coating dispersion to a grinding process at a shear rate of 500 s$^{-1}$ while maintaining a temperature of from 0 to 60° C.

In addition, WO 94/09913 discloses a process for preparing powder coating materials, in which the binder and the crosslinker are dissolved using supercritical gas, especially supercritical carbon dioxide, and the powder coating particles are generated by subsequent spraying. The preparation of aqueous powder coating dispersions is not described in WO 94/09913.

The object of the present invention is to provide an aqueous powder coating dispersion which can be applied to automobile bodies using the existing liquid coating technology and in particular can be baked at temperatures as low as 130° C. Furthermore, the powder coating dispersion ought to be very easy and inexpensive to prepare, very fine, exhibit good leveling, and lead to coatings having good technological properties, examples being good appearance and high gloss. Moreover, it ought also to be possible to use powder coating materials comprising components which are reactive at ambient temperature, such as, for example, powder coating materials based on free isocyanates, for these powder slurries without the occurrence of coagulum and the like.

This object is surprisingly achieved by means of an aqueous powder coating dispersion which is preparable by processing the binder of the powder coating material and/or the crosslinker of the powder coating material or the entire powder coating material to a powder by spray drying and then preparing an aqueous powder coating dispersion using the spray-dried powder.

The present invention additionally provides a process for preparing the aqueous powder coating dispersion and also provides for its use, in particular for coating automobile bodies, and for its use in processes for producing a multicoat paint system.

It is surprising and was not foreseeable that the powder coating dispersion of the invention is significantly easier and less expensive to prepare than conventional powder coating dispersions and yet exhibits good leveling and leads to coatings having the desired good technological properties, examples being good appearance and high gloss. Further advantages are that the powder coating dispersion of the invention can be applied to automobile bodies using the existing liquid coating technology and in particular can be baked at temperatures as low as 130° C. Finally, the powder coating dispersions of the invention are very fine.

It is essential to the invention that the powder coating dispersion is prepared using a spray-dried powder. In this context, for preparing the powder coating dispersion of the invention, it is preferred to subject the entire powder coating material to spray drying. One further embodiment of the invention comprises processing only the main binder of the powder coating material to a powder, by means of spray drying, and incorporating the crosslinker and any catalysts, auxiliaries and additives of the powder coating dispersion of the invention by subsequent admixing. Finally, it is also possible to subject only the crosslinker to spray drying and to incorporate the binder and any catalysts, additives and auxiliaries into the powder coating dispersion of the invention by subsequent admixing.

The spray drying that is essential to the invention can be conducted with the aid of conventional techniques. For example, it is possible to operate with the aid of a rotary atomizer, a pressure atomizer, or by means of pneumatic atomization. It is preferred, however, to operate using a rotary atomizer.

For the spray drying, a heated gas, in particular a heated inert gas, preferably heated air or heated nitrogen, is employed for drying. The gas is preferably being heated to a temperature such that at the respective exit speed through the nozzle the temperature of the sprayed particles is on the one hand high enough to ensure effective evaporation of the water and/or solvent and on the other hand not so high that instances of sticking/crosslinking or the like occur. Preferably, spray drying takes place at a product temperature which is below the glass transition temperature of the binder of the powder coating material. With particular preference, the temperature of the sprayed particles should be not more than 80° C., with very particular preference from 40 to 60° C. Particular preference is given to the use of gas which has been heated to a temperature of from 100 to 200° C. The amount of heat required to evaporate the water and/or the solvent can of course, however, also be supplied in whole or in part by means of other methods, an example being radiative heating.

The solution or dispersion that is used for the spray drying and is to be sprayed preferably has a solids content of from 30 to 60% by weight.

The particles can be sprayed in particular by means of a rotary atomizer, by means of a pressure atomizer, or by means of a pneumatic atomizer, preferably by means of a rotary atomizer. The use of a rotary atomizer has the advantage in this case that very finely divided powders having a narrow particle size distribution can be obtained. Moreover, especially in the case of spray drying using a rotary atomizer, the relatively large powder particles which are obtained are predominantly aggregates of smaller particles, so that the subsequent preparation of the powder slurry is easy and requires relatively little energy input.

If desired, spray drying may be followed by a classifying operation (in particular by means of air classifiers).

In the case where a rotary atomizer is used, the liquid pressure is generally from 2 to 3 bar. In the case where a pneumatic atomizer or a pressure atomizer is used, the liquid pressure is preferably from 20 to 50 bar.

The spray drying can take place with the aid of conventional spray dryers, which are available commercially, for example, from the company NIRO, Denmark, and from the company Anhydro, Denmark.

In the case of the rotary atomizers the diameter of the unit is preferably between 2.5 and 3.5 m and the length is preferably from 4.5 to 5.5 m. The temperature of the gas used for drying is within the abovementioned limits, preferably from 100 to 200° C. The amount of drying gas, preferably drying air, is preferably from 5000 to 5500 cubic meters (s.t.p.) per hour.

In the case of pressure atomization and pneumatic atomization, operation is likewise with conventional units using inert gases or air. In the case of pneumatic atomization, the amount of atomizing air or gas used per tonne of material to be atomized is generally about 1 tonne and it is preferred to operate using fine nozzles.

The flow rate through the nozzle in the case of spray drying is preferably set such that on a unit from the company NIRO Atomizer from 50 ml to 800 ml are sprayed per minute.

The powders prepared by means of spray drying, which are subsequently processed further to the powder coating dispersion of the invention, generally have an average particle size of between 5 and 50 $\mu$m. If the powders are spray dried using a rotary atomizer, the average particle. size is generally below 15 $\mu$m. When using a pneumatic atomizer, the average particle size is generally below 50 $\mu$m, and when using a pressure atomizer it is generally from 20 to 80 $\mu$m.

If a narrow particle size distribution of the powders is desired, the spray drying operation may be followed by a classifying operation, in particular by means of an air classifier. By this means the average particle size can be adjusted to from 5 to 25 $\mu$m, preferably from 8 to 20 $\mu$m.

In accordance with the invention, it is preferred to employ an aqueous powder coating dispersion which consists of a solid, pulverulent component A and of an aqueous component B, component A being a powder coating material comprising
  Aa) at least one binder,
  Ab) at least one crosslinking agent,
  Ac) if desired, one or more further binders other than (Aa) and
  Ad) if desired, one or more pigments and/or fillers,
  Ae) if desired, catalysts, auxiliaries and typical powder coatings additives and
component B being an aqueous dispersion comprising
  Ba) at least one nonionic thickener and
  Bb) if desired, catalysts and auxiliaries, and
  Bc) if desired, one or more further binders other than (Aa).

As already stated above, it is essential to the invention that the powder coating dispersion is prepared using the spray-dried binder (Aa) and/or the spray-dried crosslinker (Ab) or the spray-dried powder coating material or, respectively, the spray-dried component (A).

One preferred embodiment therefore comprises first preparing an aqueous dispersion of the binder (Aa) to which are then added, in a manner known to the skilled worker, the crosslinker component (Ab), optionally further binder (Ac), optionally pigments and/or fillers (Ad) and optionally catalysts, auxiliaries and additives (Ae) and from which then, subsequently, the powder coating material or, respectively, the component (A) is prepared by means of spray drying.

For the preparation of the aqueous dispersion of the binder, the binders in this case contain at least one group which ensures dispersibility in water. Suitable groups of this kind are nonionic groups (e.g., polyethers), anionic groups, mixtures of these two groups, or cationic groups.

In this way it is possible with preference to incorporate into the binder an acid number so high that the neutralized product can be dispersed in water to give a stable dispersion. For this purpose use is made of compounds which contain at least one reactive group (e.g., in the case of acrylate resins, ethylenically unsaturated double bond; in the case of polyesters, OH or COOH group and the like) and at least one group which is capable of forming anions. Groups which are capable of forming anions are, for example, carboxyl, sulfonic acid and/or phosphonic acid groups. The amount of ionizable acid groups available in salt form as a result of neutralization of the acid groups is generally at least 0.4% by weight, preferably at least 0.7% by weight, based on the solids. The upper limit is approximately 12% by weight. At very low acid numbers, further measures are generally necessary in order to obtain dispersibility in water.

The incorporation of the crosslinker and the other constituents to be added if desired takes place by mixing and/or dispersing using conventional equipment, e.g., by means of a dissolver or the like.

Spray drying takes place as already described above. In the course of this operation it is particularly advantageous that the high heat of evaporation of the evaporating water produces a cooling effect, so that even when using hot air or hot gas having a temperature of preferably from 100 to 200° C. the temperature acting on the powder coating particles is substantially lower and is only, for example, about 40–80° C. This also makes it possible to prepare, without problems, powder coating materials with reactive binders/crosslinkers which are difficult, if not impossible, to prepare with the conventional preparation of powder coating materials and powder coating dispersions by means of extrusion, owing to the thermal stress which the extrusion operation entails. This applies in particular to crosslinkers based on free isocyanates, but also to reactive amino resins or the like.

The use of an aqueous dispersion for spray drying has the further advantage that spray drying can take place in a spray atomizer without explosion prevention measures.

One further embodiment of the preparation of the powder coating dispersion of the invention comprises first preparing a solution of the binder in one or more organic solvents, or preparing a melt of the binder, to which are then added, in a manner known to the skilled worker, the crosslinker component and optionally catalysts, auxiliaries and additives, and from which then, subsequently, the powder coating material or, respectively, the component (A) is prepared by means of the above-described spray drying, with particular preference by using rotary atomizers.

Furthermore, it is also possible first to prepare a solution of the binder or of the powder coating material in pressurized liquefied gases or supercritical gases, such as liquid nitrogen, liquid carbon dioxide or the like, for example, and to subject this solution to spray drying.

As already described above, however, it is also possible to process only the principal binder of the powder coating material to a powder by spray drying and to incorporate the crosslinker and any catalysts, auxiliaries and additives into the powder coating dispersion of the invention by subsequent admixing. Finally, it is also possible to subject only the crosslinker to spray drying and to incorporate the binder and any catalyst, auxiliaries and additives into the powder coating dispersion of the invention by subsequent admixing.

The preparation of the powder coating dispersion of the invention using the powder coating material or the component (A) takes place by means of known methods, an example being wet grinding. To this end, component (A) is dispersed in component (B), or the powder coating material is dispersed in water, and then the aqueous powder coating dispersion is prepared with the aid of customary equipment, such as stirred mills, for example. The specific energy input during the grinding process is preferably from 20 to 500 Wh/kg.

In the course of the grinding process, the dispersion contains preferably only small amounts of solvent. It may therefore be necessary in some cases to free the grinding apparatus from solvent residues before starting the grinding process.

The average particle size of the powder coating dispersion obtained is between 1 and 25 $\mu$m, preferably less than 20 $\mu$m, with particular preference from 3 to 8 $\mu$m.

Another method of preparing the powder coating dispersions of the invention comprises processing the component A obtained by spray drying to a very fine powder, preferably having an average particle size of less than 15 $\mu$m, with particular preference having an average particle size from 5 to 10 $\mu$m, by means of suitable apparatus, e.g., by classifying. This fine powder need no longer be reground using stirred mills; instead, the powder coating dispersion can be processed by mixing component (A) with component (B) to give the powder coating dispersion of the invention, by means, for example, of a dissolver or the like.

In the text below, the individual constituents of the powder coating dispersion of the invention which is used with preference will now be elucidated further.

For the preparation of the powder coating dispersion of the invention it is preferred to use binders (Aa) which, based on the crosslinking groups, have an equivalent weight (i.e., for example, an epoxide equivalent weight or a hydroxyl equivalent weight etc.) of from 400 to 2500, preferably from 420 to 700, a number-average molecular weight (determined by gel permeation chromatography using a polystyrene standard) of from 2000 to 20,000, preferably from 3000 to 10,000, and a glass transition temperature ($T_g$) of from 20 to 100° C., preferably from 40 to 70° C., with particular preference from 40 to 60° C. (measured by means of differential scanning calorimetry (DSC)). Very particular preference is given to about 50° C. It is also possible to use mixtures of two or more binders (Aa).

In accordance with the invention, the binder(s) (Aa) used preferably comprises an acrylate copolymer which with particular preference contains vinylaromatic compounds, especially styrene, in copolymerized form. In order to limit the risk of cracking, however, the level of such compounds is not more than 35% by weight. Preference is given to from 10 to 25% by weight.

In particular, the powder coating dispersions of the invention are prepared using as component (Aa) binders containing epoxide groups (Aa1) or carboxyl-containing binders (Aa2) or hydroxyl-containing binders (Aa3) and as crosslinking component (Ab), correspondingly, carboxyl-containing crosslinkers (Ab1) or crosslinkers containing epoxide groups (Ab2) or crosslinkers which are reactive toward hydroxyl groups (Ab3). To prepare the powder coating dispersions of the invention, the crosslinkers can also be used in the form of aqueous suspensions, aqueous emulsions, and aqueous slurries.

Suitable epoxy-functional binders (Aa1) for the solid powder coating material used to prepare the dispersion are, for example, polyacrylate resins which contain epoxide groups and which can be prepared by copolymerization of at least one ethylenically unsaturated monomer containing at least one epoxide group in the molecule with at least one further ethylenically unsaturated monomer which contains no epoxide group in the molecule, at least one of the monomers being an ester of acrylic acid or methacrylic acid. Polyacrylate resins of this kind, containing epoxide groups, are known, for example, from EP-A-299 420, DE-B-22 14 650, DE-B-27 49 576, U.S. Pat. Nos. 4,091,048, and 3,781,379.

Examples of ethylenically unsaturated monomers containing no epoxide group in the molecule are alkyl esters of acrylic and methacrylic acid which contain 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxide groups in the molecule are acid amides such as, for example, acrylamide and methacrylamide, vinylaromatic compounds, such as styrene, methylstyrene and vinyltoluene, nitriles, such as acrylonitrile and methacrylonitrile, vinyl halides and vinylidene halides, such as vinyl chloride and vinylidene fluoride, vinyl esters, such as vinyl acetate, for example, and hydroxyl-containing monomers, such as hydroxyethyl acrylate and hydroxyethyl methacrylate, for example.

The polyacrylate resin containing epoxide groups can be prepared by polymerization in accordance with methods which are common knowledge.

Suitable crosslinkers (Ab1) are carboxylic acids, especially saturated, straight-chain, aliphatic dicarboxylic acids having 3 to 20 carbon atoms in the molecule. Very particular preference is given to the use of aliphatic dicarboxylic acids having 12 carbon atoms, such as dodecane-1,12-dicarboxylic acid, for example. To modify the properties of the finished powder coating materials it is possible, if desired, to use other carboxyl-containing crosslinkers as well. Examples of these which may be mentioned are saturated branched or unsaturated straight-chain dicarboxylic and polycarboxylic acids, and also polymers containing carboxyl groups.

Also suitable are powder coating materials comprising an epoxy-functional crosslinker (Ab2) and an acid-functional binder (Aa2).

Examples of suitable acid-functional binders are acidic polyacrylate resins which can be prepared by copolymerizing at least one ethylenically unsaturated monomer containing at least one acid group in the molecule with at least one further ethylenically unsaturated monomer which contains no acid group in the molecule.

The binder containing epoxide groups or the crosslinker containing epoxide groups, respectively, and the carboxyl-containing crosslinker or the carboxyl-containing binder, respectively, are usually used in an amount such that there are from 0.5 to 1.5, preferably from 0.75 to 1.25, equivalents of carboxyl groups per equivalent of epoxide groups. The amount of carboxyl groups present can be determined by titration with an alcoholic KOH solution.

Also suitable, furthermore, are powder coating materials containing a hydroxy-functional binder (Aa3) and a crosslinker which is reactive toward OH groups (Ab3).

Examples of suitable hydroxy-functional binders are hydroxyl-containing polyacrylate resins preparable by copolymerizing at least one ethylenically unsaturated monomer which contains at least one hydroxyl group in the molecule and at least one further ethylenically unsaturated monomer which contains no hydroxyl group in the molecule. Also suitable as the hydroxyl-containing binder for the powder coating material are hydroxyl-containing polyester resins which have been prepared in a conventional manner from aromatic or aliphatic or cycloaliphatic diols and/or polyols, optionally in combination with monools, and aromatic or aliphatic or cycloaliphatic dicarboxylic and/or polycarboxylic acids, optionally in combination with monocarboxylic acids. Owing to the better chalking resistance and weathering stability, aliphatic and/or cycloaliphatic structural components are preferably used for the preparation of the polyester resins.

For example, the polyester resins may have been prepared using ethylene glycol, propanediol, butanediol, neopentyl glycol, hexanediol, cyclohexanediol, 2,2-bis(4,4'-dihydroxydicyclohexyl)propane, trimethylolpropane, hexanetriol, pentaerythritol. Further suitable diols include esters of hydroxycarboxylic acids with diols, it being possible to use the abovementioned diols as the diol. Examples of hydroxycarboxylic acids are hydroxypivalic acid or dimethylolpropanoic acid. Examples of acids which can be used are adipic acid, glutaric acid, azelaic acid, sebacic acid, fumaric acid, maleic acid, tetrahydrophthalic acid, hexahydrophthalic acid, cyclo-hexanedicarboxylic acid, phthalic acid, terephthalic acid, isophthalic acid, and trimellitic acid. Also suitable are the esterifiable derivatives of the abovementioned polycarboxylic acids, such as their monoesters or polyesters with aliphatic alcohols having 1 to 4 carbon atoms or hydroxyalcohols having 1 to 4 carbon atoms. Furthermore, it is also possible to use the anhydrides of the abovementioned acids, where they exist.

Of course, it is also possible to use any desired mixtures of the binders mentioned.

As crosslinkers (Ab3) for the hydroxyl-containing binders it is possible, for example, to use compounds containing isocyanate groups. Particularly suitable are the isocyanates which are solid at room temperature, preferably crystalline isocyanates. They can be obtained by addition reaction of diisocyanates with diols, triols or polyols or diamines, triamines or polyamines, or from diisocyanates by dimerization to give uretdiones, trimerization to give isocyanurates, and with amines or water to give biurets. Also suitable as crosslinking agents for powder coating materials of the invention are diisocyanates and polyisocyanates which contain allophanate, carbodiimide and ester groups. Owing to their good stability with respect to ultraviolet light, (cyclo)aliphatic diisocyanates give rise to products having little tendency toward yellowing.

For the preparation of the powder coating dispersions of the invention it is also possible, furthermore, to use aqueous dispersions, aqueous emulsions or aqueous slurries of isocyanates or other crosslinkers. Suitable examples thus include aqueous slurries (aqueous preparations) of isocyanates based on hexamethylene diisocyanate, blocked with butanone oxime, or similar slurries of blocked isocyanates.

Examples of isocyanates suitable for the preparation of the diisocyanates and polyisocyanates used in accordance with the invention are the following: phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate. Also suitable, furthermore, are diisocyanates of the general formula (III')

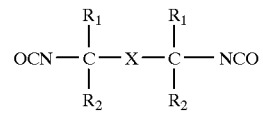

(III')

where X is a divalent aromatic hydrocarbon radical, preferably an unsubstituted or halo-, methyl- or methoxy-substituted naphthylene, diphenylene or 1,2-, 1,3- or 1,4-phenylene radical, with particular preference a 1,3-phenylene radical, and $R_1$ and $R_2$ are an alkyl radical having 1–4 carbon atoms, preferably a methyl radical. Diisocyanates of the formula (III') are known (their preparation is described, for example, in EP-A-101 832, U.S. Pat. Nos. 3,290,350, 4,130,577, and 4,439,616) and in some cases are available commercially (1,3-bis (2-isocyanatoprop-2-yl) benzene, for example, is sold by the American Cyanamid Company under the trade name TMXDI (META)®).

Also suitable are diisocyanates of the formula (IV)

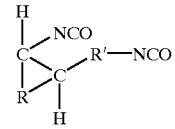

(IV')

where R is a divalent alkyl or aralkyl radical having 3 to 20 carbon atoms and R' is a divalent alkyl or aralkyl radical having 1 to 20 carbon atoms.

In the powder coating dispersions of the invention the crosslinkers containing isocyate groups can be used both in unblocked form and in blocked form.

Suitable blocking agents for the isocyanates ar the compounds commonly employed, examples being hydroxyl- and amino-containing compounds, such as aliphatic, cycloaliphatic and aromatic alkyl monoalcohols, eg., methyl, ethyl, chloroethyl, propyl, butyl, cyclohexyl, heptyl, octyl and nonyl alcohols, 3,3,5-trimethylhexanol, decyl alcohol and lauryl alcohol; phenols, such as cresol, xylenol, nitrophenol, -chlorophenol, ethylphenol, butylphenol and 2,5-di-tert-butyl-4-hydroxytoluene. Also suitable are hydroxylamines, such as diethylethanolamine, for example, and oximes, such as methyl ethyl ketoxime, acetone oxime, and cyclo-hexanone oxime.

Further candidates as crosslinkers (Ab3) for the hydroxyl-containing binders are amino resins, such as melamine resins. It is also possible, furthermore, to use condensation products of other amines and amides, e.g., aldehyde condensates of triazines, diazines, triazoles, guanidines, guanamines or alkyl- and aryl-substituted derivatives of such components, such as N,N'-dimethylurea, dicyandiamides, 2-chloro-4,6-diamino-1,3,5-triazines, 6-methyl-2,4-diamino-1,3,5-triazines, 3,5-diaminotriazoles, triaminopyrimidines, 2-mercapto-4,6-diaminopyrimidines, 2,4,6-triethyltriamino-1,3,5-triazines, and the like.

Formaldehydes are preferably suitable as the aldehyde. It is also possible, however, to use acetaldehydes, crotonaldehydes, acrolein, benzaldehydes, and furfural.

As the etherifying alcohol, the amine-aldehyde condensation products contain in particular methanol, or else ethanol, propanol, butanol, pentanol, hexanol, heptanol, benzyl alcohol and aromatic or cyclic alcohols, monoethers or glycols, and also substituted alcohols.

As crosslinking agent (Ab3) it is also possible, furthermore, to use triazine-based crosslinkers which react with the hydroxyl groups of the binder to form ester groups. These triazine-based crosslinkers are transesterification crosslinkers, such as preferably tris(alkoxycarbonylamino) triazine or the like, as also described, for example, in EP-A-604 922.

The hydroxyl-containing binder and the crosslinker are customarily used in an amount such that there are from 0.5 to 1.5, preferably from 0.75 to 1.25, equivalents of hydroxyl-reactive groups (such as isocyanate groups, for example) per equivalent of hydroxyl groups.

If the binders for preparing the powder coating dispersion of the invention are used in the form of an aqueous dispersion, carboxyl-containing monomers, such as acrylic and methacrylic acid, for example, are used to prepare the resins. In that case, to establish dispersibility in water, the carboxyl groups are neutralized at least in part with an amine or ammonia, in a manner known to the skilled worker.

The powder coating dispersions of the invention may additionally include, in component A or B, one or more binders (Ac) or (Bc), respectively, which are different from the binder (Aa) and are present preferably in an amount of from 0 to 100% by weight, based on the overall weight of the binder mixture.

Preferably, the further binder is used in component (B), with particular preference in the form of an aqueous dispersion. In this case, preferably, the aqueous dispersion of the further binder (Bc) has a refractive index which roughly corresponds to the refractive index of the powder coating dispersion. With particular preference,. the two refractive indices differ by not more than 0.2 units. This ensures high transparency of the cured films when the powder coating dispersion is used as a clear coat.

It is also preferred for the further binder (Ac) or (Bc), respectively, to have a glass transition temperature of from −30 to +20° C.

The solid powder coating materials comprise, if desired, one or more suitable catalysts for the curing of the binder and of the crosslinker.

Suitable catalysts for epoxy resin curing are phosphonium salts of organic or inorganic acids, quatenary ammonium compounds, amines, imidazole, and imidazole derivatives. The catalysts are generally used in proportions of from 0.001% by weight to about 2% by weight, based on the overall weight of the epoxy resin and of the crosslinking agent.

Examples of suitable phosphonium catalysts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide, and tetrabutylphosphonium acetate-acetic acid complex.

These and other suitable phosphonium catalysts are described, for example, in U.S. Pat. Nos. 3,477,990 and 3,341,580.

Examples of suitable imidazole catalysts are 2-styrylimidazole, 1-benzyl-2-methylimidazole, 2-methylimidazole and 2-butylimidazole. These and other imidazole catalysts are described, for example, in Belgian Patent No. 756,693.

The powder coating dispersion may, if desired, also contain suitable catalysts for urethane curing. These catalysts are commonly used in an amount of from 0.001 to 3% by weight, based on the overall weight of the powder coating material. Examples of suitable catalysts that may be mentioned are, in particular, organometallic catalysts, such as, for example, organic tin(II), tin(IV), iron, lead, cobalt, bismuth, antimony, zinc, and magnesium compounds. Also suitable are amine catalysts, such as diazabicyclooctane and diazabicycloundecane, for example.

Furthermore, if desired, the solid powder coating materials may also include auxiliaries and additives, preferably in an amount of from 0 to 5% by weight, based in each case on the overall. weight of the powder coating dispersion. These auxiliaries are preferably incorporated into component A. Examples thereof are leveling agents, antioxidants, UV absorbers, free-radical scavengers, flow aids, and devolatilizers, such as benzoin, for example.

Suitable leveling agents are those based on polyacrylates, polysiloxanes and/or fluorine compounds.

Antioxidants which can be used are reducing agents such as hydrazides and phosphorus compounds and also free-radical scavengers, e.g., 2,6-di-tert-butylphenol derivatives.

UV absorbers which can be used are preferably triazines and benzotriphenol.

As free-radical scavengers it is possible to use preferably 2,2,6,6-tetramethylpiperidine derivatives.

Component B of the preferred powder coating dispersion of the invention contains at least one nonionic thickener. Examples thereof are, for example, modified celluloses or polyurethane thickeners.

Component B may additionally include catalysts, leveling agents, antioxidants, UV absorbers, free-radical scavengers, and wetting agents. Suitable substances in this context are essentially those already listed above for component A.

Further possible additives to component B are other auxiliaries, such as defoamers and, in particular, dispersion auxiliaries, for example, preferably carboxy-functional dispersants, and also biocides, solvents and neutralizing agents, and/or water retention agents.

Suitable defoamers are preferably modified polysiloxanes.

Examples of dispersion auxiliaries are preferably ammonium and/or metal salts of polycarboxylates.

Neutralizing agents which can be used are amines, ammonia, and metal hydroxides.

Before or after wet grinding and/or the introduction of the dry powder coating material into the water, it is possible to add to the dispersion from 0 to 5% by weight of a defoamer mixture, of an ammonium salt and/or alkali metal salt, of a carboxyl-functional or nonionic dispersing auxiliary, wetting agent and/or thickener mixture, and of the other additives. In accordance with the invention it is preferred first of all to disperse defoamers, dispersing auxiliaries, wetting agents and/or thickeners in water. Then small portions of the powder coating material or, respectively, of component (A) are stirred in. Subsequently, defoamers, dispersing auxiliaries, thickeners and wetting agents are incorporated again by dispersion. Finally, again in small portions, powder coating material or, respectively, component (A) are incorporated by stirring.

In accordance with the invention the pH is adjusted preferably using ammonia or amines. The pH may initially rise in this case so as to give a strongly basic dispersion. However, the pH drops back to the levels indicated above within a few hours or days.

The powder coating dispersions of the invention can be applied by means of the methods known from liquid coating technology. In particular, they can be applied by means of spraying methods. Also suitable are electrostatically assisted high-speed rotation or pneumatic application.

The powder coating dispersions of the invention are also suitable, following appropriate pigmentation, for the preparation of pigment pastes. Pigments which may be present in the powder coating dispersion are the commonly used organic and inorganic, coloring pigments, examples being titanium dioxide, iron oxides, carbon black and similar inorganic pigments, and also organic coloring pigments, such as, for example, Indanthrene blue, Cromophthal red, Irgazine orange, Sicotrans yellow, Heliogen green, and the like. In addition, the powder coating dispersions may also include the fillers customary in the coatings sector, examples being silica, magnesium silicates, barium sulfate and titanium dioxide. The pigments and/or fillers are used in customary amounts, preferably from 0 to 10% by weight, based on the overall weight of the powder coating dispersion.

The various pigment pastes of the invention based on the powder coating dispersions (powder slurry pastes) have finenesses which are comparable with those of conventional pigment pastes (i.e., pigment pastes based on conventional, organic solvents). These pigment pastes of the invention based on the powder coating dispersions can be mixed with one another and so permit the preparation of solid-color topcoats.

Furthermore, the powder coating dispersions of the invention can also be processed to metallic basecoats by blending with metallic and/or effect pigments, such as commercial aluminum bronzes, for example, the chromated aluminum bronzes of DE-A-36 36 183, commercial stainless steel bronzes, and other customary metal platelet and metal flake pigments, and also effect pigments, such as mica, pearl luster and interference pigments, and by the use of appropriate additives, e.g., rheological agents.

The powder coating dispersions of the invention can also be used, furthermore, in the form of a clearcoat as a coating for basecoats, preferably in the automotive industry. A clearcoat dispersion of this kind is particularly suitable for waterborne coating materials based on a polyester, polyurethane resin and an amino resin.

The powder clearcoat dispersions applied to the basecoat film are generally flushed off prior to baking. This is done judiciously first at room temperature and then at slightly elevated temperature. The elevated temperature is generally from 40 to 70° C., preferably from 50 to 65° C. Flushing off is carried out for from 2 to 10 minutes, preferably from 4 to 8 minutes at room temperature. Flushing off then takes place again at the elevated temperature for the same period of time.

Baking can be carried out at temperatures as low as 130° C. Baking can be carried out at from 130 to 180° C., preferably from 135 to 155° C. With the process of the invention it is possible to obtain coat thicknesses of from 30 to 50, preferably from 35 to 45 $\mu$m. In accordance with the prior art, using transparent powder coating materials, clearcoats of comparable quality could be obtained hitherto only by applying coat thicknesses of from 65 to 80 $\mu$m.

The invention is now elucidated further with reference to a working example. All parts and percentages therein are by weight, unless expressly stated otherwise.

EXAMPLE 1 t of an aqueous powder coating suspension is spray dried to give 350 kg of powder in 3 h using a rotary atomizer having a diameter of 3 m and a length of 5 m and using drying air having a temperature of 150° C., a sprayed particle temperature (product temperature) of 50° C., and a volume of drying air of from 5000 to 5500 cubic meters (s.t.p.). The resulting powder has a particle size distribution of from 5 to 25 am. The powder obtained consists of 75% of a hydroxyl-containing acrylate, 12% of a polymeric isocyanate based on isophorone diisocyanate, blocked with malonic ester/butanone oxime, 2% of a polymeric isocyanate based on hexamethylene diisocyanate, blocked with malonic ester/butanone oxime, 10% of the triazine-based crosslinker which reacts with transesterification (TACT from the company Cytec), and 1% of a commercial light stabilizer based on a sterically hindered amine. 100 parts of the spray-dried powder are admixed with 20 parts of an aqueous dispersion of a urethane acrylate (glass transition temperature $-25°$ C) and with a commercial leveling agent and are then dispersed in a mixture of 400 parts of fully deionized water, 0.6 part of a commercial defoamer and 0.06 parts of a commercial wetting agent to form a powder coating dispersion. The dispersion is filtered through a 50 $\mu$m nylon bag and admixed with 0.05% of a commercial leveling agent. The powder coating dispersion is applied by means of a Behr Ecobell unit at 45,000 rpm, an outflow rate of 120 ml/min and a voltage of 60 kV in a coat thickness of 45 $\mu$m to a metal panel coated with an electrodeposition coating, a surfacer, and a solid-color basecoat. Initial drying at 50° C. for 5 minutes followed by baking at 145° C. for 30 minutes give a highly glossy clearcoat film which exhibits good leveling.

What is claimed is:

1. An aqueous powder coating dispersion prepared by a process comprising spray drying components selected from the group consisting of the binder of the powder coating material, the crosslinker of the powder coating material, and the entire powder coating material containing the binder and the crosslinker to give a powder and then preparing an aqueous powder coating dispersion using the spray-dried powder, wherein the binder of the powder coating material comprises at least one group in an amount sufficient to provide dispersibility in water.

2. An aqueous powder coating dispersion as claimed in claim 1, wherein the powder coating dispersion comprises a solid, pulverulent component A and of an aqueous component B, component A being a powder coating material comprising Aa) at least one binder, Ab) at least one crosslinking agent, and component B being an aqueous dispersion comprising Ba) at least one nonionic thickener.

3. An aqueous powder coating dispersion as claimed in claim 1 or 2, wherein spray drying takes place at a product temperature below the glass transition temperature of the binder of the powder coating material.

4. An aqueous powder coating dispersion as claimed in claim 1, prepared by first preparing an aqueous dispersion of the binder (Aa) to which are then added the crosslinker component (Ab) of the powder coating material, and then the powder coating material is prepared by means of spray drying.

5. An aqueous powder coating dispersion as claimed in claim 2, wherein a solution of the binder or of the crosslinker in one or more organic solvents is processed to a powder by means of spray drying and then an aqueous powder coating dispersion is prepared using the spray-dried powder.

6. A process for preparing an aqueous powder coating dispersion as claimed in claim 2, which comprises spray drying components selected from the group consisting of the binder of the powder coating material, the crosslinker of the powder coating material, and the entire powder coating material to give a powder and then dispersing the powder coating material in water.

7. The process as claimed in claim 6, wherein the powder coating dispersion is prepared by wet-grinding component A with component B.

8. The process as claimed in claim 6, wherein component (A) has an average particle size of less than 15 μm, to and the powder coating dispersion is prepared by mixing components A and B.

9. Process for producing a multicoat paint system, in which first of all a basecoat is applied, a polymer film is formed from the basecoat, a topcoat is applied to the resulting basecoat film and then the basecoat film is dried together with the topcoat film, wherein said topcoat is a powder coating dispersion as claimed in claim 1.

10. An aqueous powder coating dispersion as claimed in claim 2, wherein the component (A) further comprises compounds selected from the group consisting of one or more binders other than (Aa), one or more pigments, fillers, catalysts, levelling agents, antioxidants, UV absorbers, free-radical scavengers, flow aids, devolatilizers and mixtures thereof, and component B further comprises compounds selected from the group consisting of catalysts, binders other than (Aa), leveling agents, antioxidants, UV absorbers, free radical scavengers, wetting agents, defoamers, dispersants, biocides, solvents, neutralizing agents, and water retention agents and mixtures thereof.

11. An aqueous powder coating dispersion as claimed in claim 4, further comprising adding to an aqueous dispersion of the binder (Aa), compounds selected from the group consisting of binders other than (Aa), pigments, fillers, and catalysts.

12. An aqueous powder coating dispersion as claimed in claim 2, wherein a melt of the binder or of the crosslinker, is processed to a powder by means of spray drying and then an aqueous powder coating dispersion is prepared using the spray-dried powder.

13. A process for preparing an aqueous powder coating dispersion as claimed in claim 6 or claim 10 wherein the binder of the powder coating is spray dried, which further comprises after spray drying, admixing compounds selected from the group consisting of crosslinkers, one or more binders other than (Aa), one or more pigments, fillers, catalysts, leveling agents, antioxidants, UV absorbers, free radical scavengers, wetting agents, defoamers, dispersants, biocides, solvents, neutralizing agents, and water retention agents and mixtures thereof, and then dispersing the powder coating material in water together with compounds selected from the group consisting of leveling agents, antioxidants, UV absorbers, free radical scavengers, wetting agents, defoamers, dispersants, biocides, solvents, neutralizing agents, and water retention agents and mixtures thereof.

14. A process for preparing an aqueous powder coating dispersion as claimed in claim 6 or claim 10 wherein the crosslinker of the powder coating is spray dried, which further comprises after spray drying, admixing compounds selected from the group consisting of binder (Aa), one or more binders other than (Aa), one or more pigments, fillers, catalysts, leveling agents, antioxidants, UV absorbers, free radical scavengers, wetting agents, defoamers, dispersants, biocides, solvents, neutralizing agents, and water retention agents and mixtures thereof, and then dispersing the powder coating material in water together with compounds selected from the group consisting of leveling agents, antioxidants, UV absorbers, free radical scavengers, wetting agents, defoamers, dispersants, biocides, solvents, neutralizing agents, and water retention agents and mixtures thereof.

15. The process as claimed in claim 6, wherein component (A) has an average particle size of 5 to 10 μm, and the powder coating dispersion is prepared by mixing components A and B.

16. An aqueous powder coating dispersion as claimed in claim 1, comprising at least one further binder in the form of an aqueous dispersion.

17. An aqueous powder coating dispersion as claimed in claim 1, comprising at least one further binder having a glass transition temperature in the range of −30 to +200° C.

18. A method of coating painted and unpainted automobile body substrates, comprising a step of applying to the substrate a layer of a coating composition comprising the aqueous powder coating dispersion according to claim 1.

* * * * *